No. 837,511. PATENTED DEC. 4, 1906.
O. SCHNEEKLOTH.
ANIMAL TRAP.
APPLICATION FILED OCT. 9, 1906.
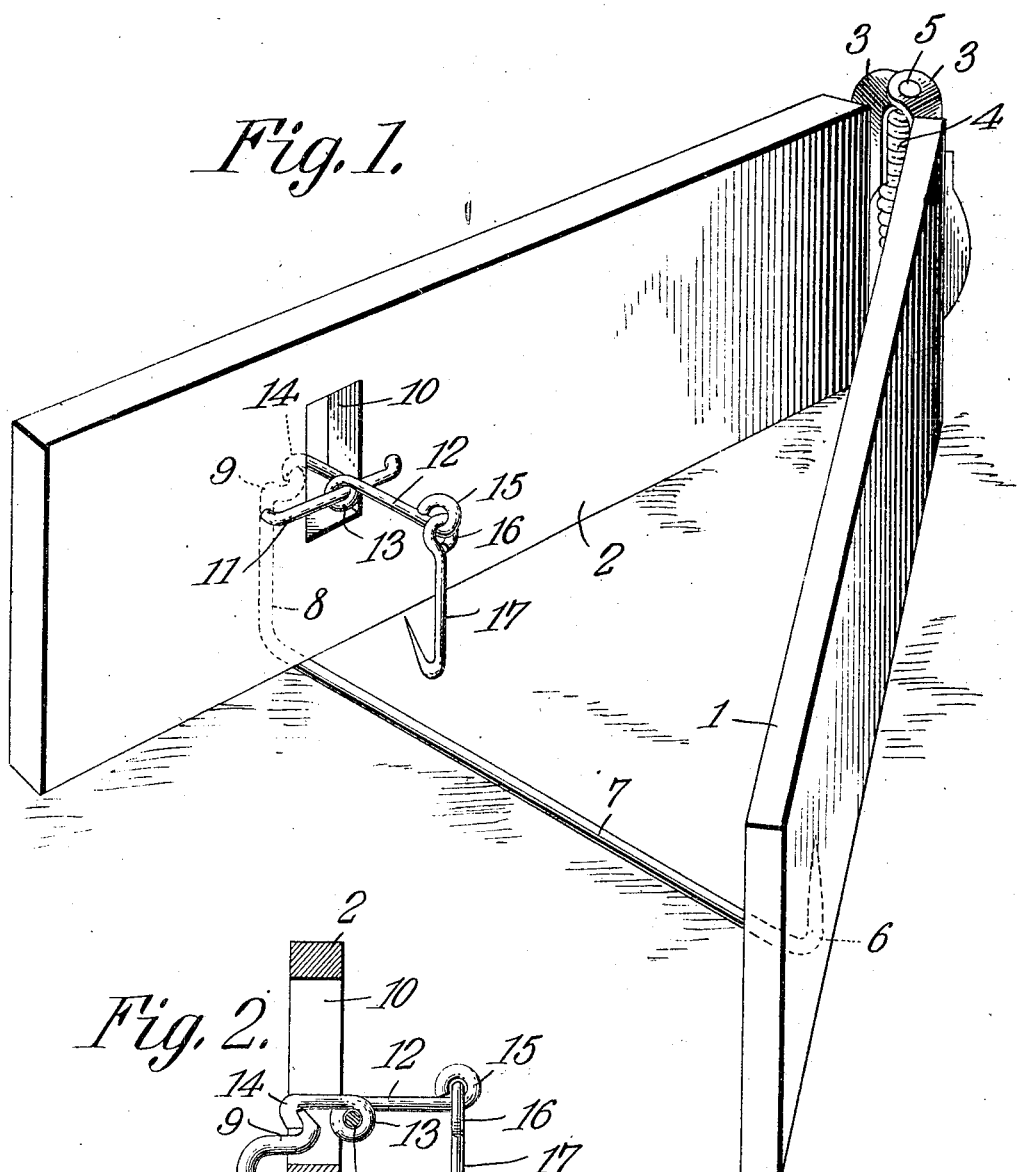
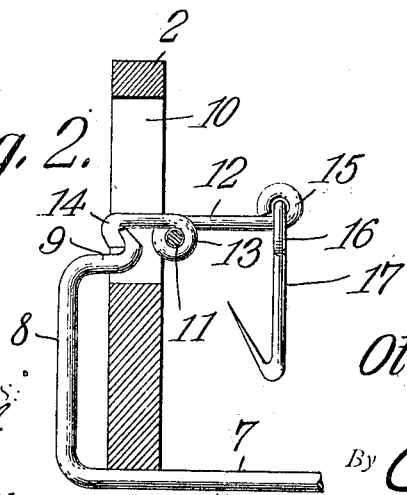
Otto Schneekloth,
INVENTOR

UNITED STATES PATENT OFFICE.

OTTO SCHNEEKLOTH, OF WHITEHALL, MICHIGAN, ASSIGNOR OF ONE-HALF TO GEORGE H. NIELSON, OF WHITEHALL, MICHIGAN.

ANIMAL-TRAP.

No. 837,511.     Specification of Letters Patent.     Patented Dec. 4, 1906.

Application filed October 9, 1906. Serial No. 338,180.

*To all whom it may concern:*

Be it known that I, OTTO SCHNEEKLOTH, a citizen of the United States, residing at Whitehall, in the county of Muskegon and State of Michigan, have invented a new and useful Animal-Trap, of which the following is a specification.

This invention relates to animal-traps.

The objects of the invention are to improve and simplify the construction of such devices; furthermore, to increase their efficiency in operation and to decrease the expense attending their manufacture.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings, forming part of this specification, Figure 1 is a perspective view of a trap constructed in accordance with the invention, and Fig. 2 is a vertical section through one of the jaws of the trap.

Like reference-numerals indicate corresponding parts in both figures of the drawings.

The improved trap of the present invention is constructed with a pair of jaws 1 and 2, which are pivotally connected with each other at one end by means of the brackets 3. The jaws 1 and 2 are adapted to be forced toward each other for the purpose of catching an animal between them by means of a coil-spring 4, which surrounds the pivot-rod 5 and has its opposite ends so arranged as to force the jaws together.

Formed in the lower edge of the jaw 1 is a socket into which is fitted the bent end 6 of a spacing-rod 7, the function of which is to hold the jaws 1 and 2 in separated position against the tension of the spring 4 until said jaws are released by an animal, as will hereinafter appear. The spacing-rod 7 extends across the under edge of the jaw 2 and is formed with a bent portion 8, which extends along the outer side of the jaw 2. At its end the bent portion 8 is bent inwardly to form an angular hook 9, which extends into the outer end of a vertical slot 10, formed in the jaw 2. Extending across the inner end of the slot 10 is a pivot-rod 11, the ends of which are bent and extended into suitable sockets in the jaw 2 on opposite sides of the slot 10. Pivotally connected with the pivot-rod 11 is a catch-lever 12, which preferably consists of a piece of wire bent to form an eye 13, which surrounds the pivot-rod 11, a hook 14 at its outer end to engage the angular hook 9 of the spacing-rod 7 and an eye 15 at its inner end to receive the eye 16 of a bait-holder 17.

Constructed as described, the method of using the trap will be apparent. The jaws 1 and 2 are pulled apart until the hook 9 of the spacing-rod 7 enters the outer end of the slot 10 in the jaw 2. The catch-lever 12 is then tilted until the hook 14 engages the hook 9 of the spacing-rod. A piece of bait is then fastened upon the bait-holder 17. When an animal touches the bait, the hook 9 becomes disengaged from the catch-lever 12, and the spring 4 throws the jaws together, so as to trap the animal. It will be observed that the jaws 1 and 2 swing in a horizontal direction. For this reason the trap can be placed upon a floor or on the ground, so that an animal in order to reach the bait will not have to pass through any small opening or over any obstruction which might tend to frighten it.

The improved trap of the present invention is strong, simple, durable, and inexpensive in construction, as well as thoroughly efficient in operation.

What is claimed is—

1. A trap comprising a pair of jaws pivotally connected with each other at one end, means for forcing said jaws together, a spacing-rod connected with one of said jaws and extending beyond the other of said jaws, said spacing-rod having a bent portion located in rear of said other jaw, and a catch-lever mounted on said other jaw and adapted to engage said bent portion for holding said jaws in separated position.

2. A trap having a pair of jaws pivotally connected with each other at one end, one of said jaws having a slot, means for forcing said jaws together, a spacing-rod connected with one of said jaws and extending beyond the edge of the slotted jaw, said rod having a bent portion extending along the outer side of said slotted jaw, and a catch-lever mounted in said slot and adapted to engage the bent portion of said spacing-rod.

3. A trap having a pair of jaws pivotally connected with each other at one end, one of said jaws having a slot and the other of said jaws having a socket in its edge, a spacing-rod having one end bent into said socket and the other end of said spacing-rod extending across the edge of the slotted jaw and having a bent portion extending along the outer side of said slotted jaw and formed with an angular hook portion adapted to enter the outer end of said slot, a pivot-rod extending across the inner end of said slot, a catch-lever consisting of a piece of wire bent around said pivot-rod to form an eye, said catch-lever having a hook adapted to engage the angular hook portion of said spacing-rod, and a bait-holder pivotally connected with the inner end of said catch-lever.

In testimony that I claim the foregoing as my own I have hereto affixed my signature in the presence of two witnesses.

OTTO SCHNEEKLOTH.

Witnesses:
GEORGE H. NELSON,
HARRY E. CARLETON.